(12) United States Patent
Conrad et al.

(10) Patent No.: US 7,249,842 B2
(45) Date of Patent: Jul. 31, 2007

(54) SAFETY EYEWEAR WITH SNAP-IN REPLACEABLE LENS AND OVER-MOLDED BUMPERS AND DECORATIVE TRIM

(75) Inventors: Jeremy Howard Conrad, Little Compton, RI (US); Raymond Curci, Smithfield, RI (US); Laurent Froissard, Cranston, RI (US)

(73) Assignee: Bacou-Dalloz Eye & Face Protection, Inc., Smithfield, RI (US)

( * ) Notice: Subject to any disclaimer, the term of this patent is extended or adjusted under 35 U.S.C. 154(b) by 0 days.

(21) Appl. No.: 10/907,518

(22) Filed: Apr. 4, 2005

(65) Prior Publication Data

US 2005/0275794 A1    Dec. 15, 2005

Related U.S. Application Data

(60) Provisional application No. 60/575,306, filed on May 28, 2004.

(51) Int. Cl.
*G02C 1/00* (2006.01)
(52) U.S. Cl. .............................. 351/83; 351/41; 351/51
(58) Field of Classification Search ................. 351/41, 351/51, 52, 62, 83, 120, 123, 158
See application file for complete search history.

(56) References Cited

U.S. PATENT DOCUMENTS

| | | | | |
|---|---|---|---|---|
| 2,442,483 A | * | 6/1948 | Blasi | 351/51 |
| 2,444,498 A | | 7/1948 | Cochran | 88/41 |
| 2,789,381 A | * | 4/1957 | Belgard | 351/51 |
| 2,842,028 A | * | 7/1958 | Belgard | 351/52 |
| 3,838,914 A | | 10/1974 | Fernandez | 351/106 |
| 4,496,224 A | * | 1/1985 | Allen | 351/155 |
| 5,428,410 A | | 6/1995 | Lei | 351/47 |
| 5,455,639 A | | 10/1995 | Magdelaine et al. | 351/47 |
| 5,467,148 A | | 11/1995 | Conway | 351/85 |
| 5,523,805 A | | 6/1996 | Kuipers et al. | 351/86 |
| 5,576,775 A | | 11/1996 | Bolle | 351/62 |
| 5,576,777 A | | 11/1996 | Gioacchini | 351/86 |
| 5,900,922 A | | 5/1999 | Moore | 351/103 |
| 5,903,331 A | | 5/1999 | Lin | 351/105 |
| 6,132,041 A | | 10/2000 | Lin | 351/105 |
| 6,357,872 B1 | | 3/2002 | Chu | 351/106 |
| 6,367,927 B2 | | 4/2002 | Yang | 351/103 |
| 6,378,181 B1 | | 4/2002 | Cargnel | 29/20 |
| 6,460,996 B2 | | 10/2002 | Okui et al. | 351/86 |
| 6,517,202 B2 | | 2/2003 | Huang | 351/103 |

FOREIGN PATENT DOCUMENTS

FR    2637090    *    3/1990    ................. 351/52

* cited by examiner

*Primary Examiner*—Huy Mai
(74) *Attorney, Agent, or Firm*—Barlow, Josephs & Holmes, Ltd.

(57) ABSTRACT

The safety eyewear includes a one-piece molded lens frame, and left and right temple bar assemblies. The one-piece lens frame includes a brow bar portion, a central bridge portion, a nose piece portion, and left and right lens frame eyewires that cooperate with the brow bar and bridge to define left and right lens openings. An over-molded elastomeric material is also used to provide soft bumpers in the inner side of the brow bar and a soft cushion on the inner surfaces of the nose piece. The creative and selective use of the over-molded material thus provides both decorative and aesthetic features while also providing functional cushioned areas.

19 Claims, 5 Drawing Sheets

SAFETY EYEWEAR WITH SNAP-IN REPLACEABLE LENS AND OVER-MOLDED BUMPERS AND DECORATIVE TRIM

CROSS-REFERENCE TO RELATED APPLICATION

This application claims priority to earlier filed U.S. Provisional Application No. 60/575,306 filed May 28, 2004, the contents of which are incorporated herein by reference.

BACKGROUND OF THE INVENTION

The instant invention relates to safety eyewear and more particularly to safety eyewear having a one-piece wrap-around frame, a replaceable lens, and over-molded elastomeric features.

Growing awareness of eye safety and the implementation of regulations requiring the use of safety eyewear by all persons within manufacturing facilities has recently prompted development of a variety of fashion conscious safety eyewear products. In the past, most safety eyewear was designed from a purely utilitarian outlook and thus the designs tended to be bulky, and not very pleasing from an aesthetic perspective. However, aesthetic appearance such as fashion, color, and sporty looks, as well as utilitarian factors, such as replacement of the lens(es) and comfort are now being taken into consideration in the design of safety eyewear.

One particular issue that has not been fully addressed to date is the "racoon-eye" appearance of some dual-lens safety eyewear having thick eyewire portions extending entirely around the lenses. Most of the current designs for dual-lens safety eyewear comprise a one-piece plastic injection molded frame. In some designs the dual-lens safety eyewear requires a substantially thick eyewire surrounding the lens to safely retain the lens in place and provide sufficient impact strength. Because of the dark colors selected for most frames, the thick eyewires stand out and tend to impart the appearance of large rings around the user's eyes, hence the expression "racoon-eye" appearance.

SUMMARY OF THE INVENTION

Although this issue is entirely an issue of aesthetics, the appearance of safety eyewear is now a major issue in the purchase of such products and can be a critical factor determining commercial success or failure of a product. It is thus an objective of the present invention to provide a dual-lens safety eyewear product that seeks to minimize the "racoon-eye" appearance, while also providing functional comfort and utilitarian features to the product.

Briefly, the safety eyewear comprises a one-piece molded lens frame, and left and right temple bar assemblies. The one-piece lens frame includes a brow bar portion, a central bridge portion, a nose piece portion, and left and right lens frame eyewires that cooperate with the brow bar and bridge to define left and right lens openings.

The safety eyewear further comprises a one-piece removable lens shield having left and right lens panels connected by a central bridge area. The lens frame is configured to snap receive the outer edges of the lens in mating channels formed on the inner surfaces of the lens frame. Two spaced channels are provided on the brow bar above the left and right lens openings. In addition, the nose piece is provided with two opposing channels on the inside edges thereof. To assemble the lens with the lens frame, the top edge of the lens is placed into the top channels on the brow bar, and then the bridge area of the lens is snapped over the shoulders of the channels on the nose piece of the lens frame. Removal of the lens for replacement is in reverse, whereby the user must slightly bend the frame to release the bridge of the lens from the channels on the nose piece.

The temple bar assemblies provide angular inclination hinges for closing the temple bars. The temple bar assemblies include a ratchet body having a ratchet blade at the front end that is received into a mating slot on a rearward extension of the brow bar. The ratchet body includes opposing pivot pins that are snapped into opposing apertures in the brow bar extension to provide a pivot axis for angular adjustment of the temple bars. The blade of the ratchet and the slot of the brow bar extension have opposed ratchet surfaces for selectively locking the temple bar assemblies in a desired angular position. The rear end of the ratchet body is pivotably connected to the front end of the temple bar with a hinge pin to form a vertical hinge axis.

Turning back to the main thrust of the invention, in order to reduce the thick appearance of the brow bar, bridge and eyewires, the lens frame is over-molded with an elastomeric trim that extends across the front of the brow bar and down over the front of the central bridge. This over-molding provides a color contrast on the wide front surfaces of the brow bar and central bridge and narrows the dark outline around the eye so that the width or thickness of the eyewires appears similar to a conventional pair of eyewear.

The over-molded elastomeric material is also used to provide soft bumpers in the inner side of the brow bar. In this regard, the elastomeric material wraps over the top surface of the brow bar and then downwardly in selected areas onto the inner surface of the brow bar.

Similarly, the over-molded elastomeric material is used to provide a soft cushion on the inner surfaces of the nose piece. In this regard, the over-molded material wraps under the lower surface of the nose.

The creative and selective use of the over-molded material thus provides both decorative and aesthetic features while also providing functional cushioned areas.

Accordingly, among the objects of the instant invention are:

the provision of safety eyewear having a removable lens shield; and the provision of safety eyewear having the appearance of a dual lens eyewear but yet having only a single lens shield;

the provision of dual lens safety eyewear that minimizes the "racoon-eye" apearance of eyewear having thick eyewires; and the provision of safety eyewear having over-molded elastomeric materials that provide an aesthetic color contrast on the front eyewires of the frame while also providing functional bumper pads on both the brow bar and nose piece of the eyewear.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
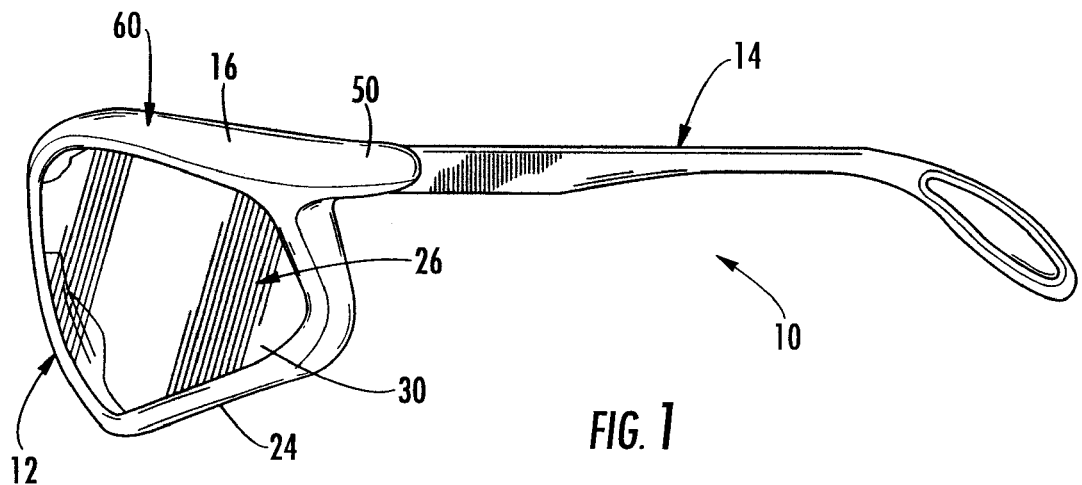
FIG. 1 is a left side view of safety eyewear constructed in accordance with the teachings of the present invention.
Figure 2:
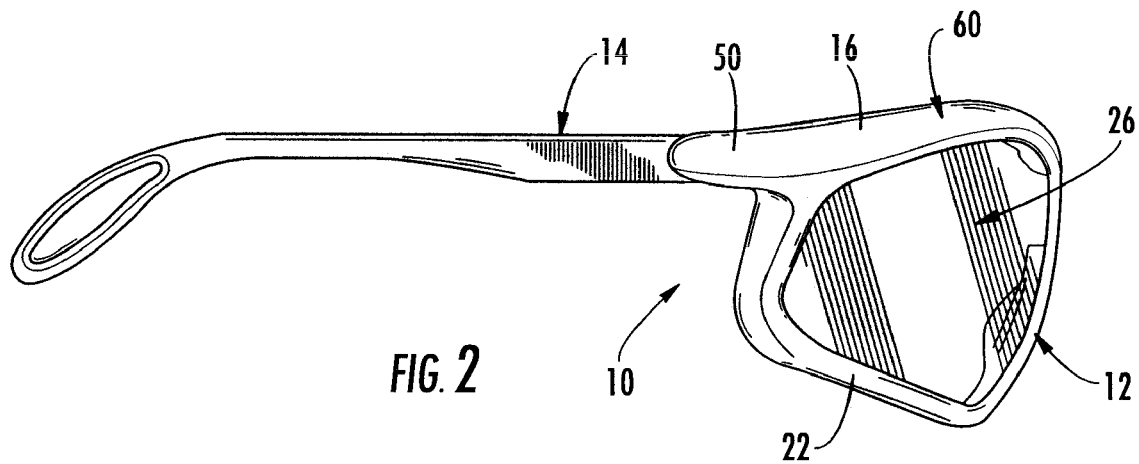
FIG. 2 is a right side view thereof.

Referring now to the drawings, the safety eyewear of the instant invention is illustrated and generally indicated at 10 in FIGS. 1-8.

As will hereinafter be more fully described, the safety eyewear 10 comprises a one-piece molded lens frame generally indicated at 12, and left and right temple bar assemblies generally indicated at 14. The one-piece lens frame 12 includes a brow bar portion 16, a central bridge portion 18, a nose piece portion 20, and left and right lens frame eyewires 22, 24 that cooperate with the brow bar 16 and bridge 18 to define left and right lens openings.

The safety eyewear 10 further comprises a one-piece removable lens shield generally indicated at 26 and having left and right lens panels 28, 30 connected by a central bridge area 32. The lens frame 12 is configured to snap receive the outer edges of the lens 26 in mating channels formed on the inner surfaces of the lens frame 12. Two spaced channels 34, 36 are provided on the brow bar 16 above the left and right lens openings to receive the upper edge 39 of the lens. In addition, the nose piece 20 is provided with two opposing channels 38, 40 on the inside edges thereof receive the lower edges 42 of the notch below the bridge 32 of the lens. To assemble the lens 26 with the lens frame 12, the top edge 39 of the lens 26 is placed into the top channels 34, 36 on the brow bar 16, and then the bridge area 32 of the lens 26 is snapped over the shoulders of the channels 38, 40 on the nose piece 20 of the lens frame 12. Removal of the lens 26 for replacement is in reverse, whereby the user must slightly bend the frame 12 to release the bridge 32 of the lens 26 from the channels 38, 40 on the nose piece 20.

The temple bar assemblies 14 provide both angular inclination of the temples 14 relative to the frame 12 and hinges for closing the temple bars 14. The temple bar assemblies 14 include a ratchet body 44 having a ratchet blade 46 at the front end that is received into a mating slot 48 on a rearward extension 50 of the brow bar 16. The ratchet body 44 includes opposing pivot pins 52 that are snapped into opposing apertures 54 in the brow bar extension 50 to provide a pivot axis for angular adjustment of the temple bars 14. The blade 46 of the ratchet body 44 and the slot 48 on the brow bar extension 50 have opposed ratchet surfaces 56 (inside of the slot not shown) for selectively locking the temple bar assemblies 14 in a desired angular position relative to the lens frame 12. The rear end of the ratchet body 44 is pivotably connected to the front end of the temple bar 14 with a hinge pin 58 to form a vertical hinge axis.

Figure 3:
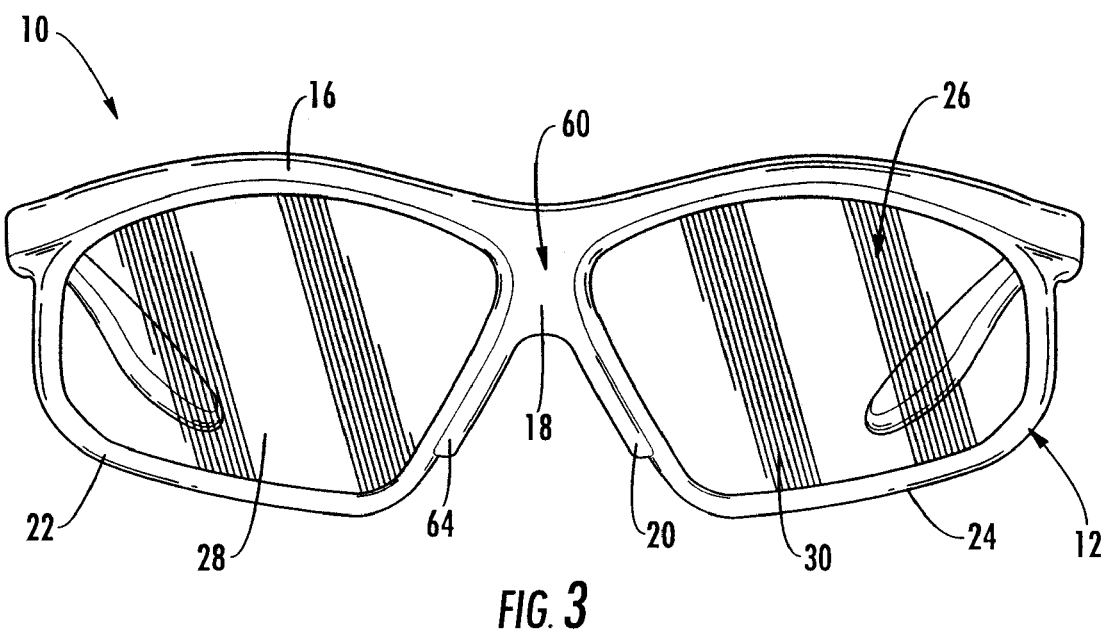
FIG. 3 is a front view thereof.
Figure 4:
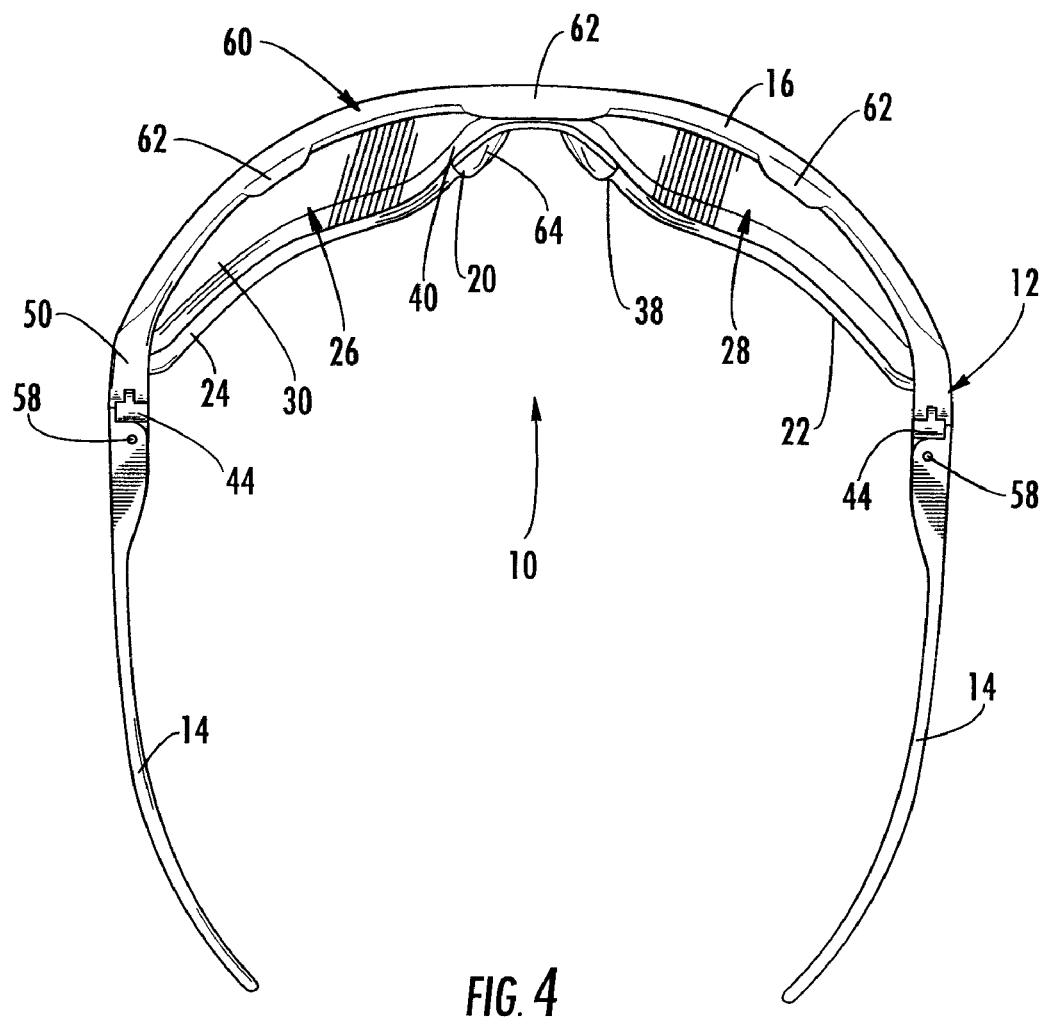
FIG. 4 is a top view thereof.
Figure 5:
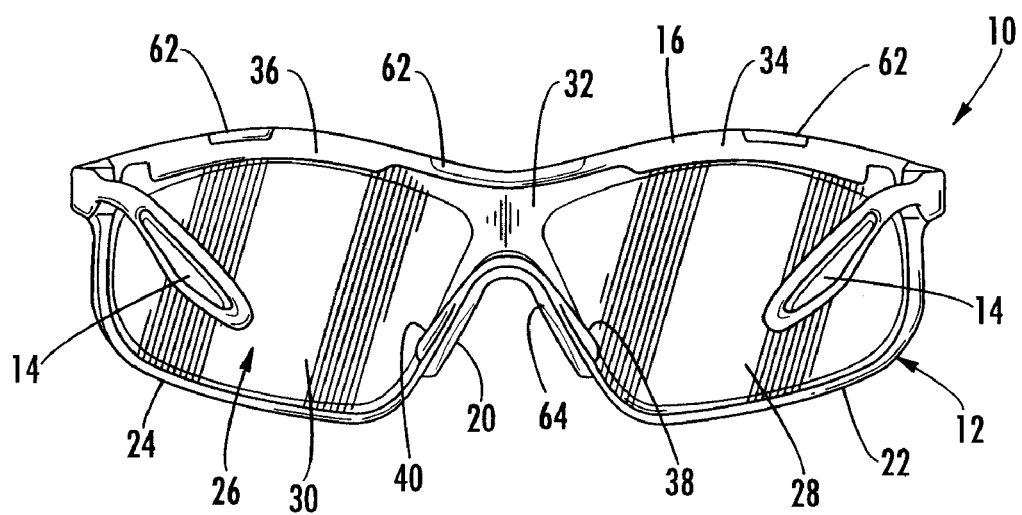
FIG. 5 is a rear view thereof.
Figure 6:
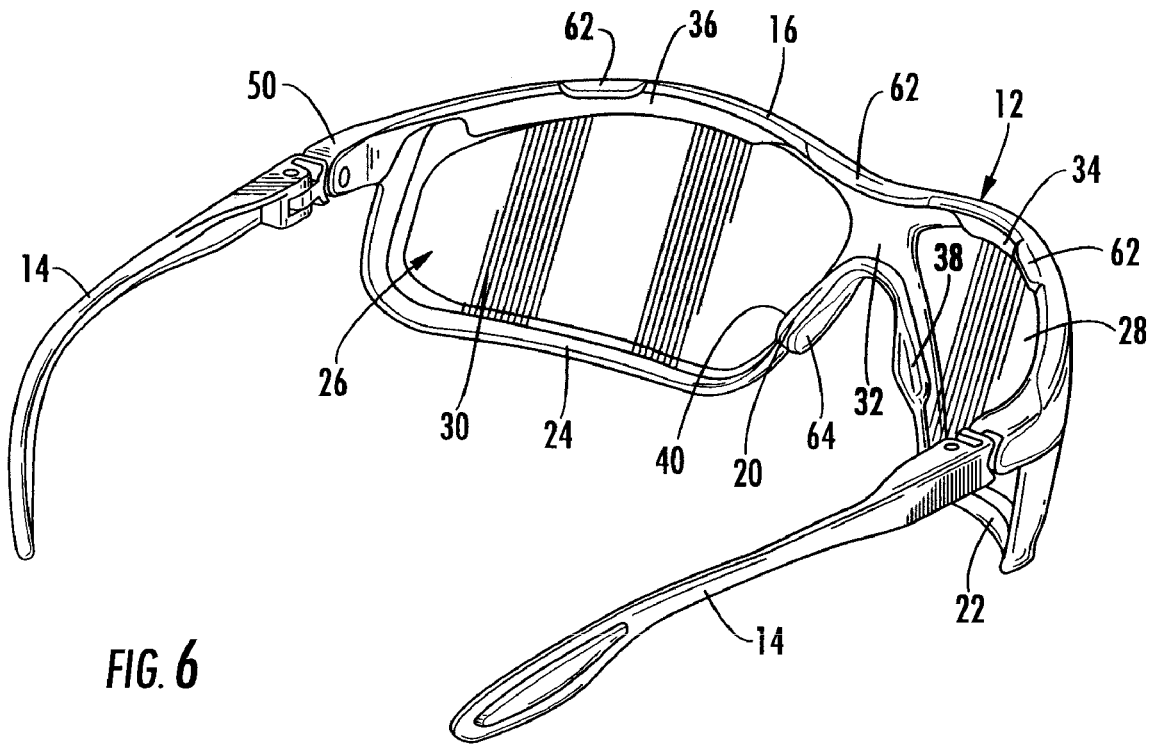
FIG. 6 is a rear perspective view thereof.
Figure 7:
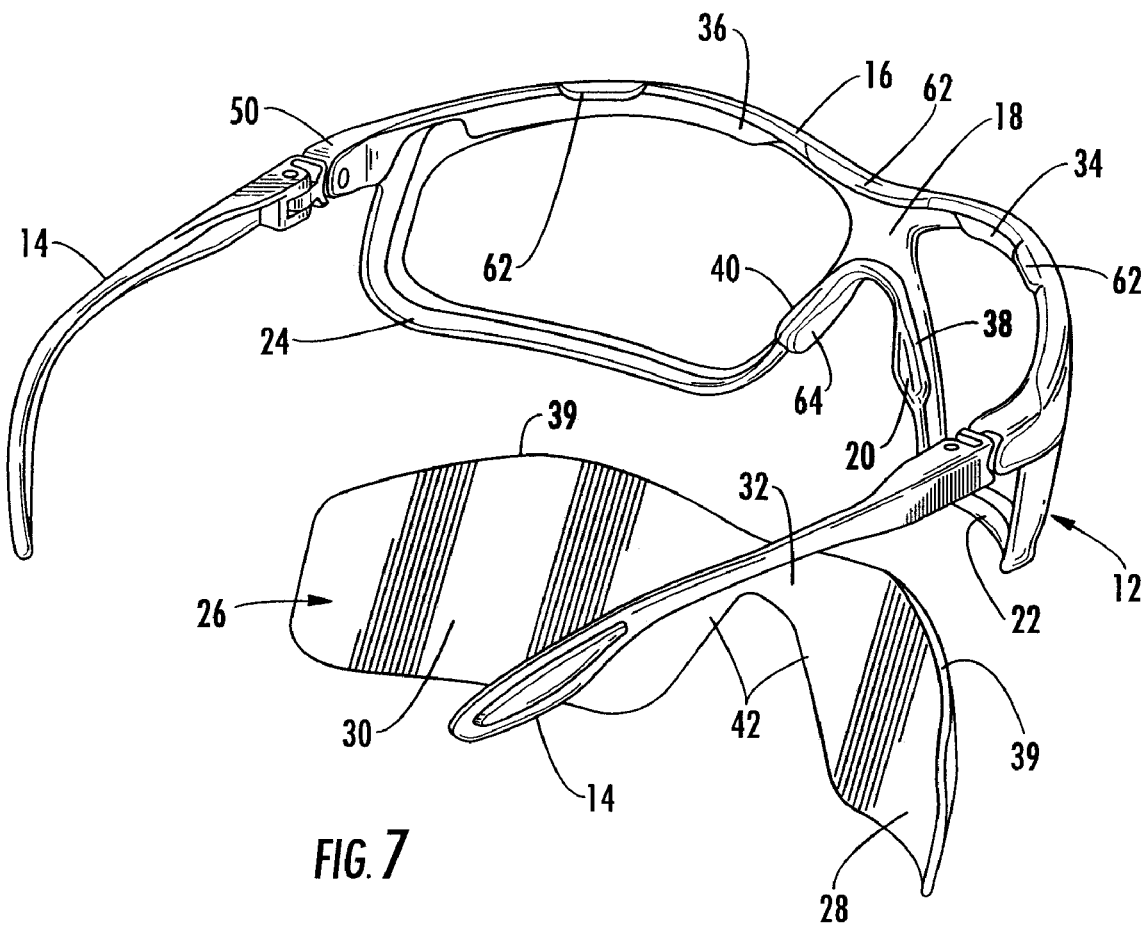
FIG. 7 is an exploded rear perspective view thereof showing the lens separated from the frame.
Figure 8:
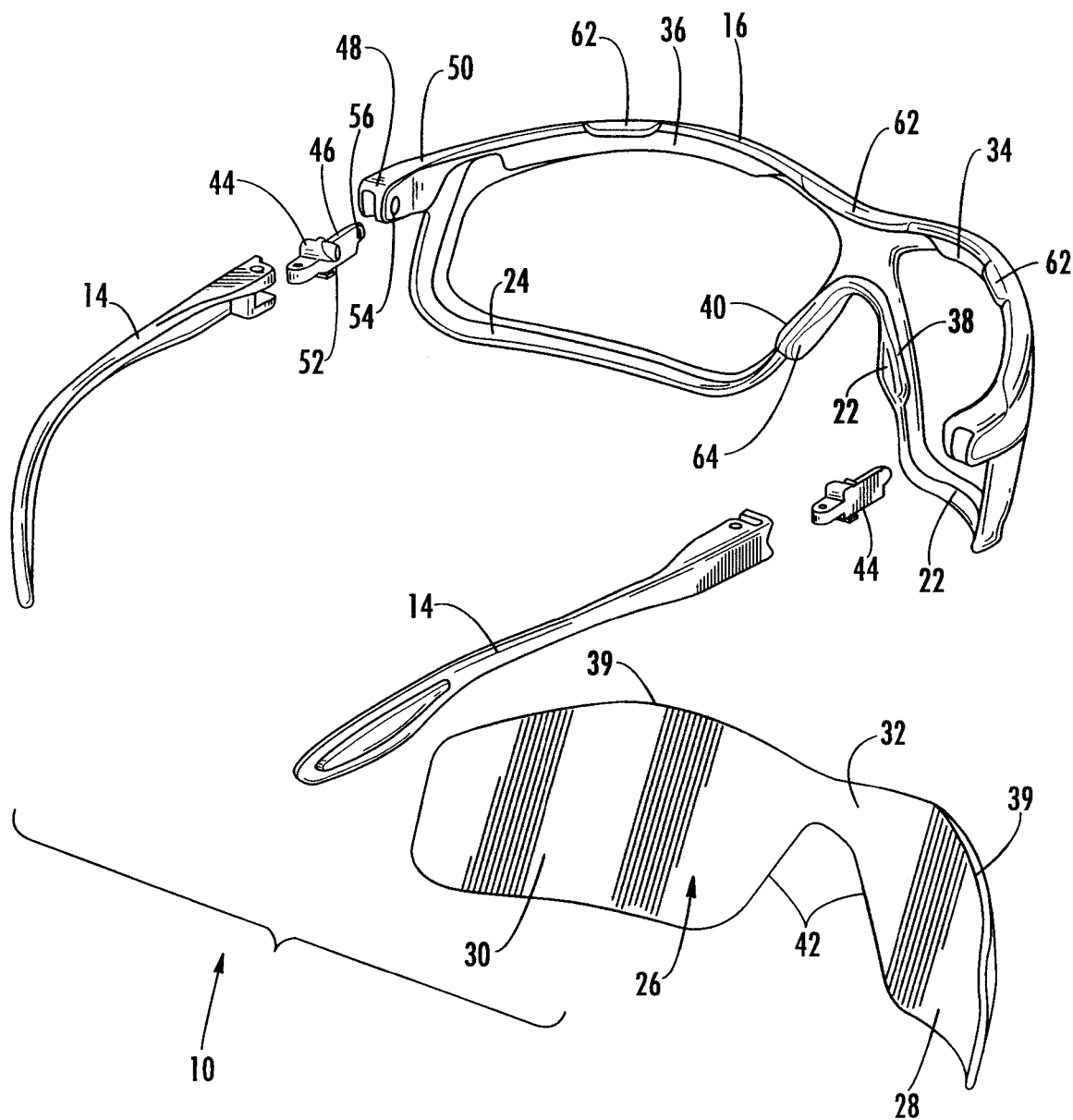
FIG. 8 is another exploded rear perspective view thereof showing the lens, ratchet body, and temple bars separated from the frame.

Turning back to the main thrust of the invention, in order to reduce the thick appearance of the brow bar 16, bridge 18 and eyewires 22, 24, the lens frame 12 is over-molded with an elastomeric trim (contrasting color) generally indicated at 60 that extends across the front of the brow bar 16 and down over the front of the central bridge 18 (see FIG. 3). This over-molding 60 provides a color contrast on the wide front surfaces of the brow bar 16 and central bridge 18 and narrows the dark outline around the eye so that the width or thickness of the eyewires 22, 24 appears similar to a conventional pair of eyewear.

The over-molded elastomeric trim 60 is also used to provide soft bumpers 62 on the inner side of the brow bar 16. In this regard, the elastomeric material wraps over the top surface of the brow bar 16 and then downwardly in selected areas onto the inner surface of the brow bar 16.

Similarly, the overmolded elastomeric material is used to provide a soft cushion 64 on the inner surfaces of the nose piece 20. In this regard, the overmolded material wraps under the lower surface of the nose piece 20.

It can therefore be seen that the present invention discloses a novel and creative use of over-molded material to provide both decorative and aesthetic features while also providing functional cushioned areas. For these reasons, the instant invention is believed to represent a significant advancement in the art that has substantial commercial merit.

Figure 9:
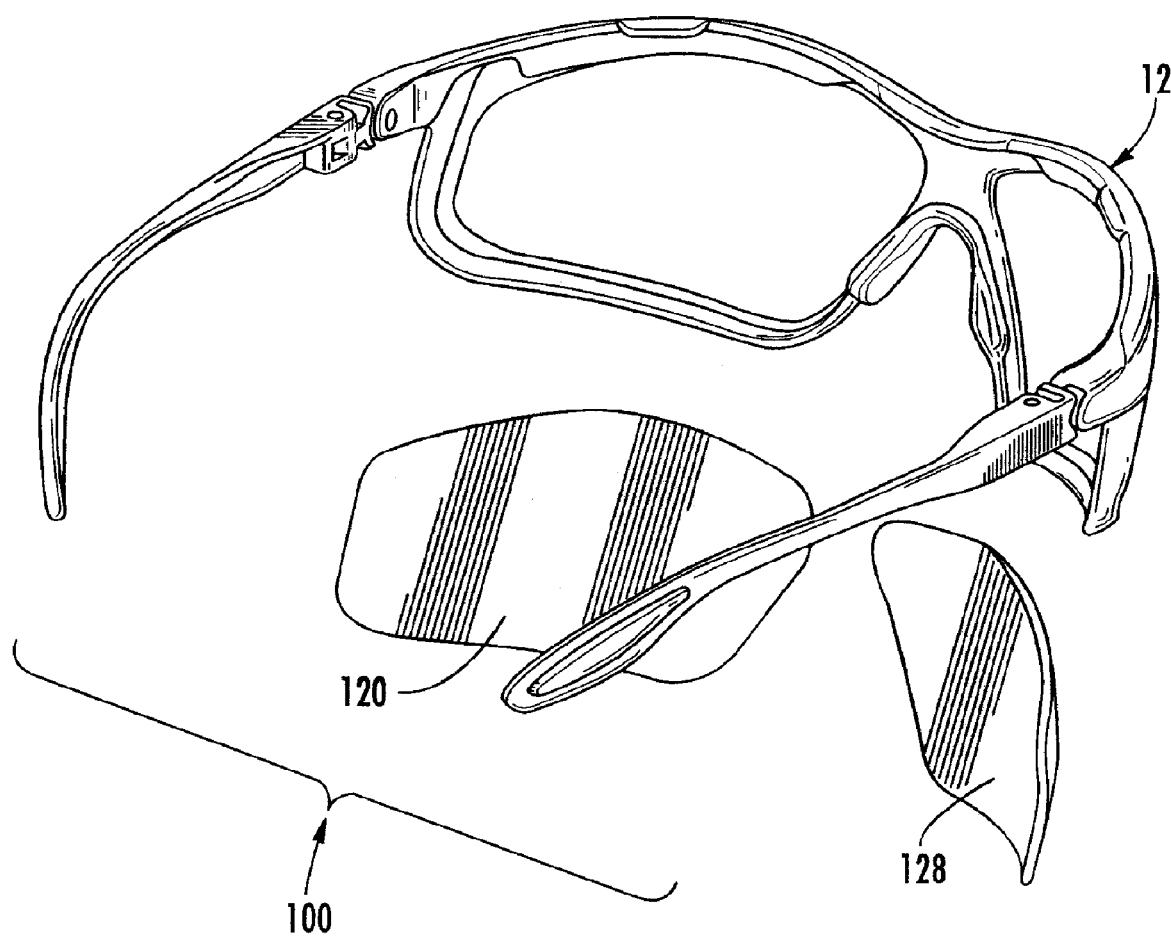
FIG. 9 is an exploded rear view of an alternative embodiment having two lens shields.

While there is shown and described herein certain specific structure embodying the invention, it will be manifest to those skilled in the art that various modifications and rearrangements of the parts may be made without departing from the spirit and scope of the underlying inventive concept. For example, FIG. 9 is a rear view of an alternative embodiment 100 with a left lens element 102 and a right lens element 104 rather than a one-piece lens shield 26 of the preferred embodiment 10. Therefore, the inventive concept should not be limited to the particular forms herein shown and described except insofar as indicated by the scope of the appended claims.

What is claimed is:

1. A pair of safety eyewear comprising:
   a brow bar having a left portion, a right portion and a central portion;
   a bridge connector depending from the central portion of the brow bar;
   a left eye wire depending from and cooperating with the left portion of the brow bar and the bridge connector to form a left lens opening;
   a right eye wire depending from and cooperating with the right portion of the brow bar and the bridge connector to form a right lens opening;
   a left temple-bar rearwardly extending from the left portion of the brow bar;
   a right temple-bar rearwardly extending from the right portion of the brow bar;
   a trim layer of a contrasting color from that of the brow bar and bridge connector, the trim layer formed on the brow bar and the bridge connector to minimize the appearance of the brow bar and bridge connector; and
   said trim layer further including soft bumpers to provide a cushion to the wearer for comfort and against impacts.

2. The eyewear of claim 1, wherein the trim layer is formed from an elastomeric material.

3. The eyewear of claim 1, wherein the trim layer is over-molded onto the brow bar and bridge connector.

4. The eyewear of claim 1, wherein said soft bumpers are formed on the brow bar.

5. The eyewear of claim 1, wherein said soft bumpers are formed on the bridge connector.

6. The eyewear of claim 1, further comprising a unitary lens interfittingly engaged into the left lens opening and the right lens opening.

7. The eyewear of claim 6, wherein the unitary lens is snap-received into the left lens opening and right lens opening.

8. The eyewear of claim 1, further comprising:
a left lens interfittingly engaged into the left lens opening; and
a right lens interfittingly engaged in to the right lens opening.

9. The eyewear of claim 1, further comprising:
means for angular adjustment of the inclination of the left temple-bar relative to the brow bar; and
means for angular adjustment of the inclination of the right temple-bar relative to the brow bar.

10. A pair of safety eyewear comprising:
a brow bar having a left portion, a right portion and a central portion;
a bridge connector depending from the central portion of the brow bar;
a left eye wire depending from and cooperating with the left portion of the brow bar and the bridge connector to form a left lens opening;
a right eye wire depending from and cooperating with the right portion of the brow bar and the bridge connector to form a right lens opening;
a unitary lens interfittingly engaged into the left lens opening and the right lens opening;
a left temple-bar pivotably connected to and rearwardly extending from the left portion of the brow bar, the left temple-bar operable between an open position and a closed position;
a right temple-bar pivotably connected to and rearwardly extending from the right portion of the brow bar, the right temple-bar operable between an open position and a closed position;
a trim layer of a contrasting color from that of the brow bar and the bridge connector, the trim layer formed on the brow bar and the bridge connector to minimize the appearance of the brow bar and bridge connector; and
said trim layer further including soft bumpers to provide a cushion to the wearer for comfort and against impacts.

11. The eyewear of claim 10, wherein the trim layer is formed from an elastomeric material.

12. The eyewear of claim 10, wherein the trim layer is over-molded onto the brow bar and bridge connector.

13. The eyewear of claim 10, wherein said soft bumpers are formed on the brow bar.

14. The eyewear of claim 10, wherein said soft bumpers are formed on the bridge connector.

15. The eyewear of claim 10, wherein the unitary lens is snap-received into the left lens openings opening and right lens opening.

16. A method of improving the aesthetics of safety eyewear comprising:
molding an eyewear frame including a brow bar having a left portion, a right portion and a central portion, a bridge connector depending from the central portion of the brow bar, a left eye wire depending from and cooperating with the left portion of the brow bar and the bridge connector to form a left lens opening, a right eye wire depending from and cooperating with the right portion of the brow bar and the bridge connector to form a right lens opening;
overmolding an elastomeric material of a contrasting color over the eyewear frame to minimize the appearance of the brow bar and the bridge connector; and
forming soft bumpers from the elastomeric material on the eyewear frame to provide a cushion to the wearer for comfort and against impacts.

17. The method of claim 16, wherein said soft bumpers are formed on the brow bar.

18. The method of claim 16, wherein said bumpers are formed on the bridge connector.

19. A method of improving the aesthetics of safety eyewear comprising:
molding an eyewear frame including a brow bar having a left portion, a right portion and a central portion, a bridge connector depending from the central portion of the brow bar, a left eye wire depending from and cooperating with the left portion of the brow bar and the bridge connector to form a left lens opening, a right eye wire depending from and cooperating with the right portion of the brow bar and the bridge connector to form a right lens opening;
overmolding a trim layer from an elastomeric material of a contrasting color over the eyewear frame to minimize the appearance of the brow bar and the bridge connector;
forming soft bumpers from the elastomeric material on the brow bar to provide a cushion for the comfort of the wearer and protection against impacts; and
forming a soft cushion on the bridge connector from the elastomeric material to provide a cushion for the comfort of the wearer and protection against impacts.

* * * * *